Patented Apr. 15, 1924.

1,490,646

UNITED STATES PATENT OFFICE.

JOHN THOMAS, OF CARLISLE, ENGLAND, ASSIGNOR TO SCOTTISH DYES, LIMITED, OF CARLISLE, CUMBERLAND, ENGLAND.

DYESTUFF.

No Drawing.   Application filed October 1, 1923. Serial No. 665,950.

*To all whom it may concern:*

Be it known that I, JOHN THOMAS, a subject of the King of Great Britain and Ireland, and residing at Murrell Hill Works, Carlisle, in the county of Cumberland, England, have invented certain new and useful Improvements in and Relating to Dyestuffs, of which the following is a specification.

This invention relates to the production of colouring matters and has for its object to utilize waste products from the manufacture of flavanthrone.

In the production of this body by treating 2-amino-anthraquinone with antimony pentachloride in boiling nitrobenzene, experiments have shown that the reaction does not as a rule proceed smoothly and a considerable quantity of by-products is formed.

I have found that if after the flavanthrone has been filtered off the nitrobenzene mother liquors are treated so as to remove the nitrobenzene, a black residue is left behind.

The experiments have also shown that if the black residue is submitted to the action of oxidizing agents a vat dyestuff is formed which dyes cotton from an alkaline hydrosulphite vat biscuit brown shades which are of good fastness to light, washing and bleaching.

My invention therefore consists in a method for the production of a black body as an intermediate for dye manufacture, which method consists in treatment with antimony pentachloride of 2-amino-anthraquinone suspended in nitrobenzene, separation of the flavanthrone produced and removal of the nitrobenzene from the remaining liquor.

The invention also consists in the treatment of the aforesaid black residue by oxidation for the production of a dye.

The invention also consists in the methods for the production of dyes or intermediates herein described and in the products obtained when these processes are used.

In carrying the invention into effect according to one form 10 parts by weight of the aforesaid black residue which has been very finely powdered are suspended in 100 parts by weight of sulphuric acid of strength 10 per cent by weight and 25 parts of sodium bichromate and the mixture kept at 100° C. for several hours. It is then filtered and washed. The paste is a dirty yellowish-brown colour and is ready for immediate use after the ordinary vat practice.

According to a modified form instead of the finely ground powder the residue may be dissolved in cold sulphuric acid and then blown into water so as to form a finely divided suspension, to which may be added bichromate, and then the reaction proceeded with as described above.

Having now described my invention what I claim as new and desire to secure by Letters Patent is:—

1. The method for the production of a black body which consists in the treatment of 2-amino-anthraquinone suspended in nitrobenzene with antimony pentachloride, separation of the flavanthrone thus produced and removal of the nitrobenzene from the remaining liquor.

2. The method which consists in the oxidation of the black body prepared by the method claimed in claim 1.

3. The method which consists in the oxidation of the black body prepared by the method claimed in claim 1 by means of a bichromate in the presence of sulphuric acid.

4. The method for the production of a vat dyestuff which consists in treatment of the black body prepared according to the method claimed in claim 1 by means of a bichromate in the presence of sulphuric acid solution at a temperature of about 100° C. for several hours, filtering and washing off the yellowish-brown paste thus formed.

5. A yellowish-brown vat dyestuff prepared by the oxidation of the black residue left after removing the nitrobenzene in the production of flavanthrone by treatment of 2-amino-anthraquinone with antimony pentachloride in boiling nitrobenzene.

In testimony whereof I have signed my name to this specification.

JOHN THOMAS.